No. 845,875. PATENTED MAR. 5, 1907.
P. E. LEWIS.
INSTRUMENT FOR SURVEYING BORE HOLES.
APPLICATION FILED JUNE 21, 1905.
2 SHEETS—SHEET 1.
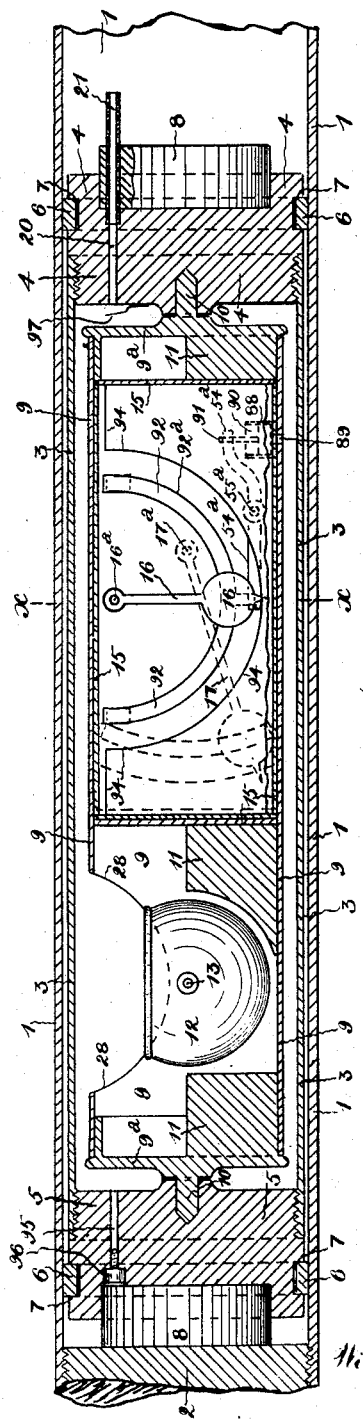
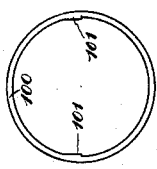
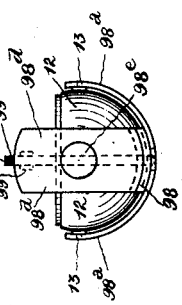
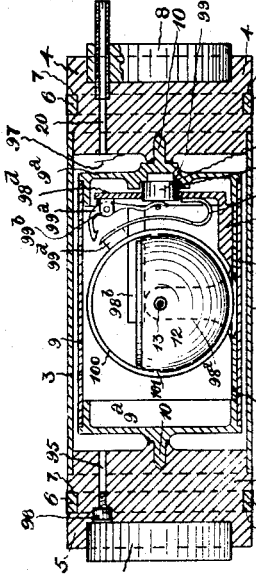
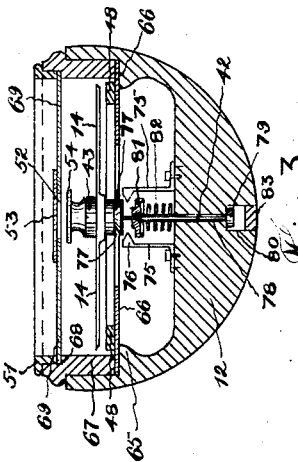
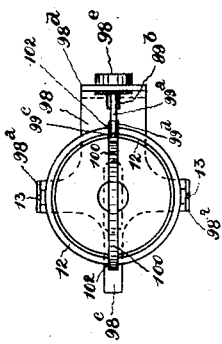

No. 845,875. PATENTED MAR. 5, 1907.
P. E. LEWIS.
INSTRUMENT FOR SURVEYING BORE HOLES.
APPLICATION FILED JUNE 21, 1905.
2 SHEETS—SHEET 2.
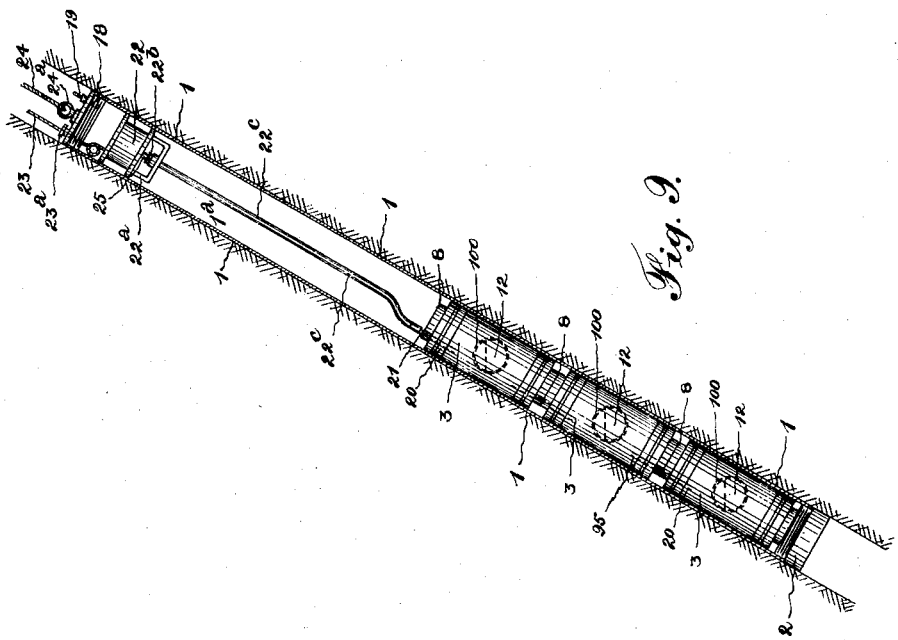
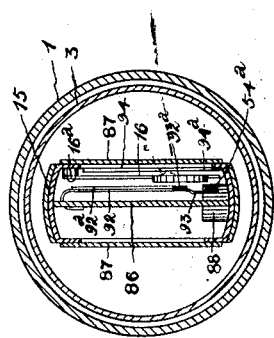
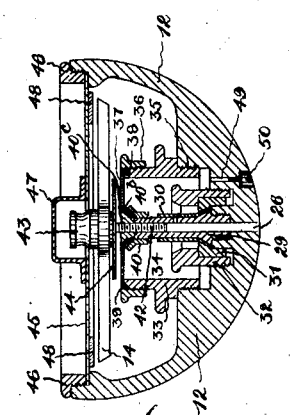

UNITED STATES PATENT OFFICE.

PERCY EDWARD LEWIS, OF JOHANNESBURG, TRANSVAAL, ASSIGNOR OF ONE-FOURTH TO LUTHER CYRIL FRANCK, OF JOHANNESBURG, TRANSVAAL.

INSTRUMENT FOR SURVEYING BORE-HOLES.

No. 845,875.      Specification of Letters Patent.      Patented March 5, 1907.

Application filed June 21, 1905. Serial No. 266,339.

*To all whom it may concern:*

Be it known that I, PERCY EDWARD LEWIS, a subject of the King of Great Britain, residing at Johannesburg, Transvaal, have invented certain new and useful Improvements in Instruments for Surveying Bore-Holes, of which the following is a specification.

This invention has reference to instruments designed for surveying bore-holes.

It relates more particularly to means for fixing the indicators (the magnetic needle and plummet or plummets, when the latter are employed) in the positions they assume at the point to be surveyed in the bore-hole and is designed to accomplish this in an efficient and speedy manner and so allow the indications to be obtained without undue loss of time.

According to my invention the indicators are arranged in a suitable casing and means are provided for admitting air or gas under pressure into or for exhausting the air or gas from said casing, which by the increased or reduced pressure operates mechanism which fixes the indicators in the positions they assume at the point to be surveyed.

In order that my invention may be more readily understood, I append explanatory drawings, illustrative thereof, marked with letters of reference corresponding to the following description.

Figure 1 respresents a longitudinal section of one form of instrument in the casing embodying some of the features of my invention. Fig. 2 is a sectional elevation through the center of the compass-box. Fig. 3 is a sectional elevation of a modification of the compass-box. Fig. 4 is a transverse section on line X X, Fig. 1, showing the means for fixing the plummet or plummets. Fig. 5 is a longitudinal section of another form of the invention in which the plummets are dispensed with. Fig. 6 is an end elevation of the compass illustrated in Fig. 5 and its carrying or supporting frame. Fig. 7 is a plan of the compass and supporting-frame. Fig. 8 is a side elevation of the vertical ring which encircles the compass-box. Fig. 9 represents a vertical sectional elevation taken through the bore-hole, showing three of the instruments (illustrated in Figs. 5 to 8) arranged in the outer casing and the means for controlling the admission of the compressed air or gaseous fluid to said instruments.

In the several figures of the drawings like numerals of reference indicate the same or corresponding parts in so far as they apply.

In the general arrangement of the instrument, as shown more particularly in Fig. 1, 1 represents an outer tubular casing, which serves for inclosing the instrument or instruments, if two or more are employed, for checking the information or data thereby obtained. The casing 1 is shown fitted at the lower end with a screwed plug 2, which serves for closing the same.

3 represents the external casing of the instrument proper, which casing 3 is shown fitted at the ends with screwed plugs or end pieces 4 5, and 6 represent packing-rings of rubber or other suitable material located in annular grooves 7, formed around the plugs 4 5, which steady the instrument in the casing, and, if desired, make an air-tight joint with the interior of the outer tube 1.

8 represent pads or buffers of rubber or other suitable resilient material.

9 is an inner revoluble tube or casing which constitutes a carrying-frame for the several parts of the instrument. This inner tube 9 is at its ends fitted with caps $9^a$, on which are formed trunnions or pivots 10, which have bearings in the inner ends of the two plugs 4 5, about which pivots said inner tube 9 is free to oscillate.

11 represents weights in the inner tube 9 and caps $9^a$, which operate to bring said inner tube into such a position that the plummets lie in a vertical plane.

12 is the compass-box, which is supported on trunnions 13 inside the inner tube 9 and carries the magnetic needle 14.

15 is the casing in which the plummet or plummets 16 17 are located. Two plummets are shown in Fig. 1 of the drawings, one for measuring the angle or inclination of the hole to the vertical and the other for measuring the angle or inclination of the hole to the horizontal. $16^a$ and $17^a$ represent the pivots or points of suspension in said casing 15 of the plummets 16 17.

The above-mentioned parts of the instrument, which do not in themselves constitute any feature of the present invention, may be constructed and arranged either as illustrated or in any other suitable manner.

In Fig. 9 I show one method of using the invention. In this arrangement three of the instruments shown in Figs. 5 to 8 (and hereinafter described) are located at the bottom of the protecting-casing 1, the lower end of which is closed by the plug 2. Instead of employing three of these instruments, as shown, one or more of the instruments shown in Fig. 1 may be placed inside the casing 1. The upper portion 1ª of this casing is utilized as the storage for a quantity of compressed air or any suitable gaseous fluid under pressure. This air or gas is pumped or otherwise passed into the casing 1 through an aperture in the top of the cap 18 of the casing 1, in which is fitted a check or non-return valve 19. In the screwed plug 4 in the upper end of the external casing 3 is formed a hole or passage 20, which places the interior of said casing 3 in communication with the interior of the outer casing 1. 21 represents a tube which coincides with the hole 20 in the screw-plug and projects through the buffer 8 into the casing 3. In the upper end of the casing 1 is arranged an electromagnet 22, which is constructed with a frame 22ª for carrying a valve 22ᵇ. 22ᶜ is a preferably rigid pipe fitted over the outer end of the pipe 21 and projected through the frame 22ª, which pipe 22ᶜ forms at its upper end a seat for the valve 22ᵇ. 23 is an electric cable which passes through a hole fitted with a gland 23ª in the cap 18 in the upper end of the casing 1 and serves for conducting the current to the electromagnet 22, and 24 is a cord attached to the cap 18 by means of the swivel-piece 24ª, which cord serves for raising and lowering the containing casing 1 in the bore-hole. When the circuit is closed by means of a switch or otherwise at the surface, the current is passed through the electromagnet 22, and the core 25 attracts the valve 22ᶜ and raises it off its seat in the upper end of the pipe 22ᶜ and so allows the compressed air or other fluid from the upper portion 1ª of the casing 1 to pass down the pipe 22ᶜ through the hole 20 in the plug 4 to the external casing 3 of the instrument proper.

In Fig. 2, illustrative of one form of the means whereby the compressed gaseous fluid operates to fix the magnetic needle 14, 26 represents an aperture formed in the bottom of the hemispherical compass-box 12, communicating, as shown in Fig. 1, with the interior of the external casing 3 through the opening 28 in the inner revoluble tube 9. Inside the compass-box 12 and over the aperture 26 is arranged a valve consisting of a metal center tube 29, formed with a screw-thread at its lower end and screwed into the compass-box 12 above the aperture 26, and 30 is a rubber tube placed over the center tube 29, which allows the compressed gaseous fluid to pass through the port or passage 26 into the compass-box 12 and prevents its return. The rubber tube 30 is held in position on the center tube 29 of the valve by means of the ring or cylindrical piece 31 and the cylindrical nut 32, screwed into the box 12 round said ring 31. 33 is a hollow cylindrical piece forming an annular chamber 34 round the valve on the inside of the box 12. This piece 33 is screwed into a recess 35, formed in the box 12 round the valve. Round the upper end of the cylindrical piece 33 is screwed a nut or ring 36, which serves for fixing a rubber diaphragm 37 round the top of said cylindrical piece 33. The cylindrical piece 33, as shown, is beveled at the top, and above the edge of the rubber diaphragm 37 on the beveled end 38 is placed a conical ring 39, over which screws the nut or ring 36. The conical ring 39 serves to press the edge of the diaphragm 37 firmly on its seat round the beveled end 38 of the cylindrical piece 33, and by removing the nut or ring 36 from contact with the rubber diaphragm 37 allows it to be easily screwed into position. 42 is the needle which supports or forms the pivot for the magnetic needle 14. This needle 42 is shown screwed in the upper end of the center tube 29 of the valve. The upper end of the center tube 29 of the valve is formed with an external screw-thread, and over this end is screwed a nut 40, which at its upper end is shaped to form a conical recess in which is seated the inner edge of the rubber diaphragm 37. Above the inner edge of the diaphragm 37 round its seating in the nut 36 is placed a conical ring 40ᵇ, and screwed over the conical ring 40ᵇ is a nut 40ᶜ, which presses the inner edge of the rubber diaphragm 37 on its seating inside the nut 36. The nut 40ᶜ is constructed with a countersunk head, so that it does not project appreciably above the level of the rubber diaphragm 37. The magnetic needle 14 is constructed with a central boss 43. To the boss 43 of the needle 14 on the under side and immediately above the rubber diaphragm 37 is fixed a plate 44. In the top of the compass-box 12 above the needle 14 is arranged a disk or piece of glass, mica, or other suitable preferably transparent material 45. The glass or transparent disk 45 is formed with an opening at the center, which is covered by means of a cap 47. The transparent disk 45 is held in position by means of the ring 46, screwed into the top of the compass-box 12. On the under side of the transparent disk 45 is fixed a rubber ring or washer 48.

The operation of the mechanism is as follows: When the compressed gaseous fluid is admitted to the casing 3, it is free to enter the inner revoluble tube 9 by the opening 28. The fluid then enters the aperture 26 and passes through the valve into the chamber 34, surrounding the valve, and beneath the rubber diaphragm 37. The increased pressure distends or expands the rubber diaphragm 37 in an upward direction, causing it to come into contact with the plate 44 and raise it and with it the magnetic needle 14 and force it onto its seat against the rubber washer or ring 48. The parts remain in these positions so long as the pressure is maintained inside the chamber 34 in the compass-box 12. A small hole 49 is formed in the compass-box 12, communicating with the chamber 34, formed round the valve, in which hole is fitted a plug 50, upon the removal of which the compressed air or gaseous fluid escapes from said chamber 34 and allows the rubber diaphragm 37 and magnetic needle 14 to again assume their normal positions.

In the modification shown in Fig. 3 the compass-box 12 is constructed with an internal annular projection 65, which forms a seating for a plate 66, formed with an open center. This plate 66 is secured in position by means of a ring or cylindrical piece 67, which latter is also constructed with a recess 68 at the top, in which is fitted a plate 69, which in this case need not be of transparent material. The plate 69 is secured in position in the recess 68 by means of another ring 51. The plate 69 is formed with a hole 52 at the center, and over this hole 52 is secured a rubber disk or diaphragm 53. The pivot-pin 42 for the magnetic needle 14 is located in a hole 78, formed through the bottom of the compass-box 12. At its lower end the pivot-pin 42 is constructed with a head or enlargement 79, which is free to move vertically in a hole 80, formed in the under side of the box 12. To the pin 42, inside the compass-box 12, is attached a cap or disk 81, between which and the inside of the compass-box 12 is located a spring 82. This spring 82 serves to keep the pivot-pin 42 in its normal position, and the head 79 serves to prevent it being raised beyond a certain point. The hole 80, in which the head 79 of the pivot-pin 42 is located, is closed by means of a plug 83. The boss 43 of the magnetic needle 14 is fitted at the top with a disk or plate 54. The rubber ring or washer 48 is fixed on the plate 66 beneath the magnetic needle 14. In the bottom of the compass-box 12 beneath the needle 14 are fixed two (or more) spring-catches 75, which at their upper and free ends are shaped with projections 76, which are adapted to engage a V-groove 77, formed in the under side of the boss of the magnetic needle 14 when the latter is lowered against the rubber ring or washer 48. By this means the needle 14 is retained in position on the rubber ring 48 when the pressure is removed from the top of the diaphragm 53. In the operation of this arrangement the gaseous fluid enters the revoluble casing 9 through the hole 28, and acting on the surface of the rubber diaphragm 53 distends it and forces it through the hole 52 in the center of the plate 69 when it comes into contact with the plate 54 on the top of the boss 43 of the magnetic needle 14 and forces the latter onto its seat on the rubber ring or washer 48. Meantime the under portion of the boss of the needle 14 has pressed out the spring-catches 75, which have come into engagement with the V-groove 77, and so retain the needle 14 in position on the rubber ring 48. The parts are retained in these positions until the spring-catches 75 are released, whereupon the spring 82, engaging the cap 81 on the pivot-pin 42, raises the latter until the head 79 is in the top of the recess 80, at which time the needle 14 is clear of the rubber ring or washer 48. The spring 82 for the pivot-pin 42 is such that it yields readily to the pressure exerted by the diaphragm 53 on the magnetic needle 14.

In Figs. 1 and 4 I show the arrangement for fixing the plummets 16 and 17, when such are employed. I illustrate this arrangement in connection with the plummet 16; but it will be understood that the same construction is used for the other plummet 17. The casing or box 15, containing the plummets 16 17, is formed into two compartments vertically by means of the vertical plate 86. The casing 15 is fitted with sheets of preferably transparent material 87 at either side, through which the positions of the plummets 16 17 may be ascertained. Inside the plummet-casing 15 is fixed a cylinder 88, which is placed in communication with the interior of the external case by means of apertures 89, formed in the inner revoluble tube 9 and the plummet-case 15. Inside the cylinder 88 is a piston 90, the piston-rod 91 of which is attached at its outer extremity to one arm of the trigger-lever 54ª, fulcrumed on the pin 55ª inside the casing 15. 92 is a spring of U shape, which at its extremities is fixed to the division-plate 86. It is preferably covered at the front with a strip of rubber 92ª. The spring 92 is constructed at the bottom with a projection 93, which is engaged by the other arm of the trigger-lever 54ª. The U-spring 92 is located at the back of the plummet, and when released by the trigger-lever 54ª disengaging the projection 93 it springs forward and fixes the plummet against the plate 94, which latter is preferably covered at the edge with a strip of rubber or other suitable material 94ª. When the compressed gaseous fluid is admitted to the case of the instrument, it passes in through the apertures 89 into the cylinder 88 and raises the piston 90. This raises the one arm of the trigger-lever 54ª and causes the other arm to disengage the projection 93 at the bottom of the U-spring 93, whereupon the latter is released and springs forward and engages the plummet and holds it against the plate 94.

In case two or more of the instruments are employed for obtaining simultaneous readings then the plug 5 in the lower end of the external casing 3 of the instrument proper may, as shown in Figs. 1 and 5, be constructed with a hole 95 for placing the casings of the instruments in communication, as shown in Fig. 9. When not in use, the holes 95 may be closed by means of a plug 96. (See Figs. 1 and 5.) A baffle-plate 97 may be fixed on the inner end of the plug 4 to prevent the impact of the compressed gaseous fluid on the cap 9ª of the inner revoluble tube 9 vibrating the parts of the instrument.

In Figs. 5, 6, 7, and 8 I show a modified form of my invention and one in which the plummets 16 17, employed in the previously-described arrangement for measuring the angles or inclinations of the hole to the vertical and horizontal, are dispensed with. In this construction I provide means for fixing the magnetic needle 14 in the position it assumes at the point to be surveyed and I also provide means for fixing the compass-box 12 bodily in the position into which it swings at the point to be surveyed. In this arrangement the outer casing 3 of the instrument proper is, as shown in the construction in Fig. 1, fitted with the end plugs 4 5, packing-rings 6, rubber buffers 8, pipe 21, communicating with the hole 20, and the hole 95, closed by the plug 96. The end caps 9ª are formed with the trunnions 10, which have bearings in the plugs 4 5. The compass 12 is carried by a frame or carriage 98, which is shaped to fit inside the revoluble casing 9. This frame 98 is constructed with curved arms 98ª, which form bearings for the trunnions 13 of the compass-box 12. 98ᵇ are strips formed inside and longitudinally of the inner casing 9, which by serving as guides and stops for the upper ends of the arms 98ª keep the compass-box 12 and bracket 98 in position and prevent them rotating inside the inner casing 9. The part 98ᶜ of the frame 98, abutting the inside of the cap 9ª, prevents any movement of the compass-box 12 longitudinally of the casing 9. In the part 98ᵈ of the frame 98 is formed a hole in which is located a piston 98ᵉ. This piston 98ᵉ projects into an annular recess 98ᶠ, formed on the boss of the cap 9ª on the inside. 99 is a hole which places the interior of the casing 3 in communication with the recess 98ᶠ at the back of the piston 98ᵉ. In the part 98ᵈ of the frame 98 on the inside and above the piston 98ᵉ is located a trigger-lever 99ª, which is fulcrumed at 99ᵇ. One arm of this trigger-lever 99ª is attached to the piston 98ᵉ by means of a pin or screw which is free to work in a slot longitudinally of the trigger-lever 99ª. 99ᶜ is a spring which is fixed at one extremity to the inside of the part 98ᵈ of the frame 98 below the piston 98ᵉ. This spring 99ᶜ has attached to its free extremity a rubber gage notches formed in the inside of the compass-box 12. The compass-box 12 is formed with a slight annular shoulder 102, against which the ring 100 abuts when it engages the notches and serves to retain it in position on the compass-box 12.

In the operation of this instrument the compressed air or gaseous fluid is admitted into the space between the casing 3 and the inner revoluble tube 9 and passes through the hole 99 to the rear of the piston 98ᵉ. This forces the piston 98ᵉ inward or toward the compass 12 and by moving the trigger-lever 99ª on its pivot 99ᵇ causes the hook to disengage the spring 99ᶜ, whereupon the latter springs forward until the rubber pad 99ᵈ comes into contact with the periphery of the ring 100 and firmly secures the compass-box 12 in the position it assumes at the point to be surveyed. The spring 99ᶜ is of sufficient strength to hold the compass-box 12 against the action of gravity. The means for fixing the magnetic needle 14 may be either of the construction shown in Fig. 2 or in Fig. 3. In Fig. 5 of the drawing the spring 99ᶜ is shown released by the trigger-lever 99ª and pressing the rubber pad 99ᵈ against the ring 100, and so preventing movement of the compass-box 12 in the vertical plane.

In Fig. 9 I show three of the instruments illustrated in Figs. 5 to 8, the outer casings 3 of which are intercommunicating, as previously explained. The circles represent the three compass-boxes 12 and rings 100 and show the horizontal position assumed by the top of the compass-box 12.

In using the instruments constructed in accordance with Figs. 1 and 2 and 4 or Figs. 1, 3, and 4 the magnetic needle 14 and the plummet or plummets 16 17 are placed in their normal positions, so that they are free to move about their points of support or suspension. The instrument or instruments is or are then placed in the protecting-casing 1 and the compressed gaseous fluid then admitted to the upper portion 1ª of said casing. The instrument is then lowered to the point in the bore-hole which it is desired to survey. Sufficient time is then allowed for the magnetic needle 14 and plummet or plummets 16 17 to come to rest, whereupon the electric circuit is closed, and the electromagnet 22 then opens the valve 22ᵇ, which allows the compressed gaseous fluid to enter the instrument and operate to fix the magnetic needle 14 and plummet or plummets 16 17 in the positions they have assumed in the manner previously explained.

sition at the point to be surveyed, the compressed gaseous fluid is admitted to the interior of the casing 3 and passing in through the aperture 99 moves the piston 98ª forward and releases the spring 99ᶜ, which fixes the compass-box 12. When the piston 98ª is moved forward, the gaseous fluid then enters the interior of the casing 9 and fixes the compass-needle 14 in the manner hereinbefore explained.

If desired, the case of the instrument may be filled or partially filled with water, oil, or other suitable liquid, so that when the compressed gaseous fluid is released the pressure will be transmitted through the liquid to operate the mechanism for fixing the needle 14 and plummet or plummets 16 17.

What I claim as my invention, and desire to protect by Letters Patent, is—

1. In an instrument for surveying boreholes, the combination of an indicator, a casing inclosing the same, means for fixing the indicator and means for changing the pressure of the air or gas in the casing to actuate the means for fixing the indicator.

2. In an instrument for surveying boreholes, the combination with the indicators of a casing inclosing the same means for fixing the indicators and means for reducing the pressure of the air or gas in said casing to actuate the first-mentioned means by the internal pressure.

3. In an instrument for surveying boreholes the combination with a compass or magnetic needle of means for fixing the same said means being actuated through the medium of a gaseous fluid substantially as described.

4. In an instrument for surveying boreholes, the combination with a magnetic needle and a plummet, of means for fixing said magnetic needle and plummet in the positions they assume at the point to be surveyed and means for operating the first-mentioned means by a gaseous fluid, substantially as described.

5. In an instrument for surveying boreholes the combination of a compass comprising a compass-box and magnetic needle, means for fixing said magnetic needle and the compass-box in the positions they assume at the point to be surveyed and means for operating the first-mentioned means by a gaseous fluid, substantially as described.

6. In an instrument for surveying boreholes the combination with a compass-box, a magnetic needle and a pin supporting the same, of a distensible diaphragm which when distended fixes the magnetic needle, and means for distending the diaphragm by fluid-pressure.

7. In an instrument for surveying boreholes the combination of a compass-box, a pin yieldingly supporting a magnetic needle, a magnetic needle, a distensible diaphragm above said needle which when distended depresses the needle and fixes it, substantially as described.

8. In an instrument for surveying boreholes, the combination of a compass-box, a pin yieldingly supporting a magnetic needle, a magnetic needle, a distensible diaphragm above said needle, a ring or washer of resilient material below the needle onto which the needle is depressed and held when the diaphragm is distended, and means for retaining the needle in position when it is forced onto its seat on the resilient ring or washer through the medium of a compressed gaseous fluid, substantially as described.

9. In an instrument for surveying boreholes, the combination of a compass-box and magnetic needle therein, means for yieldingly supporting said magnetic needle, a distensible diaphragm above said needle, a ring or washer of resilient material below the needle onto which the needle is depressed and held when the diaphragm is distended, and means consisting of spring-catches which engage the needle and serve to secure it in position when it is forced onto the ring or washer through the medium of compressed air or other gaseous fluid, substantially as described.

10. In an instrument for surveying boreholes, the combination of a compass-box and magnetic needle therein constructed with a central boss, a pin which forms a support for the magnetic needle located in a hole and formed with a head fitting a recess in the under side of the box which serves as a stop for the pin when moved in an upward direction, a disk fixed to the pin inside the box, a spring located between said disk and the inside of the box which serves to keep the pin in its normal position, a plate fitted inside the box, a ring or washer of resilient material secured on the top of said plate beneath the magnetic needle, a plurality of spring-catches fitted to the bottom of the box on the inside adapted to secure the magnetic needle when it is pressed onto the resilient rubber ring or washer, another plate closing the box above the needle formed with a central aperture above said boss of the magnetic needle, and a distensible diaphragm secured to the plate over the aperture which is adapted when distended through the medium of compressed air or other gaseous fluid to engage the boss of the magnetic needle to force the needle onto the rubber ring or washer, substantially as described.

11. In an instrument for surveying boreholes, the combination of a compass-box and magnetic needle therein, constructed with a central boss and with a groove in said boss on the under side, a pin forming a pivot for said magnetic needle, said pivot-pin located in a hole in the bottom of the compass-box and formed with a head adapted to reciprocate in a recess, a plug closing said recess, a disk or plate attached to the upper end of the pin inside the compass-box, a spring interposed between said plate and the top of the compass-box on the inside, a plate or disk formed with an open center, arranged inside the box, a ring or nut securing said plate in position, a ring or washer of resilient material above said plate and beneath the magnetic needle, another plate or disk formed with a hole at the center fixed in the box above the magnetic needle, a ring or nut for securing said plate or disk, an india-rubber disk fixed to the top plate above the central aperture which is adapted when distended through said aperture to engage the top of the boss of the magnetic needle to force it onto its seat on the rubber ring or washer, and a plurality of spring-catches fixed to the bottom of the box on the inside adapted to engage the the groove in the under side of the boss when the magnetic needle is forced onto the resilient ring or washer through the medium of compressed air or other gaseous fluid, substantially as described.

12. In an instrument for surveying boreholes, the combination with a plummet of a spring medium and means actuated by compressed air or other gaseous fluid for releasing said spring medium to fix the plummet in the position it assumes in the bore-hole at the point to be surveyed, substantially as described.

13. In an instrument for surveying boreholes, the combination of a plummet, a spring adapted when released to fix said plummet in the bore-hole at the point to be surveyed, a piston actuated by compressed air or gaseous fluid which operates means for releasing said spring, substantially as described.

14. In an instrument for surveying boreholes, the combination of a plummet, a spring, a catch-lever serving to maintain said spring in its inoperative position, a cylinder, a piston located in said cylinder, said piston serving to operate the catch-lever to release the spring when actuated by compressed air or other gaseous fluid, substantially as described.

15. In an instrument for surveying boreholes, the combination of a plummet, a U-spring located at the back of said plummet, a catch-lever which engages said spring and maintains it in its inoperative position, a cylinder, a piston therein, said piston actuating the catch-lever to disengage the U-spring when compressed air or other gaseous fluid is admitted to the cylinder, substantially as described.

16. In an instrument for surveying boreholes, the combination of a casing, a plummet pivotally supported therein, a U-spring located at the rear of the plummet, fitted with a strip of resilient material and constructed with a projection, a plate located in front of the plummet fitted with a strip of resilient material against which the plummet is secured by means of the spring when the latter is released, a catch-lever which by engaging the projection serves to maintain the spring in its inoperative position, a cylinder, a piston therein connected to the catch-lever for operating the lever to release the spring when compressed air or other gaseous fluid is admitted to the cylinder, substantially as described.

17. In an instrument for surveying boreholes, the combination with a compass-box of a vertical ring encircling said box, and means operated by gaseous-fluid pressure for fixing the compass-box in the position it assumes at the point to be surveyed.

18. In an instrument for surveying boreholes, the combination with the compass-box of a vertical ring encircling said box, means operated by gaseous-fluid pressure for fixing the compass-box through the medium of said ring in the position it assumes at the point to be surveyed, a magnetic needle located in said box, and means for simultaneously fixing said magnetic needle.

19. In an instrument for surveying boreholes, the combination with the compass-box and magnetic needle of a vertical ring encircling said box, means operated by gaseous-fluid pressure for fixing the magnetic needle and compass-box in the positions they assume at the point to be surveyed.

20. In an instrument for surveying boreholes, the combination with the compass-box and magnetic needle of a vertical ring encircling said box, means operated by gaseous-fluid pressure for fixing the magnetic needle and compass-box in the positions they assume at the point to be surveyed, and means for controlling the gaseous-fluid pressure.

21. In an instrument for surveying boreholes, the combination with the compass of a vertical ring encircling the same, a spring adapted to come into engagement with the vertical ring to fix the compass, and means actuated by gaseous-fluid pressure for releasing said spring to fix the compass.

22. In an instrument for surveying boreholes, the combination with the compass of a vertical ring encircling the same, a spring adapted to come into engagement with the vertical ring, a catch-lever engaging said spring and means for operating said catch-lever to release the spring to fix the compass by fluid-pressure.

23. In an instrument for surveying boreholes, the combination with the compass of a vertical ring encircling the same, a spring adapted to come into engagement with the vertical ring, a catch-lever engaging said spring, and a piston for operating said catch-lever to release the spring to fix the compass by fluid-pressure.

24. In an instrument for surveying boreholes, the combination with a revoluble casing, of a compass pivotally supported in said revoluble casing, a vertical ring encircling said compass, a spring adapted to come into engagement with the vertical ring, a catch-lever engaging said spring, and a piston actuated by fluid-pressure for operating said catch-lever to release the spring to fix the compass.

25. In an instrument for surveying boreholes, the combination with an outer casing of an inner revoluble casing, a compass pivotally supported in said revoluble casing, a vertical ring encircling said compass, a spring adapted to come into engagement with the vertical ring, a pad of resilient material fixed to said spring, a catch-lever engaging said spring, and a piston actuated by fluid-pressure for operating said catch-lever to release the spring to fix the compass.

26. In an instrument for surveying boreholes, the combination with an outer casing of a revoluble inner casing, a frame, a compass pivotally carried by said frame, a vertical ring encircling said compass, a spring and pad carried by the frame and adapted to come into engagement with the vertical ring, a catch-lever fixed to the frame and adapted to engage said spring, a piston actuated by fluid-pressure for operating said catch-lever to release the spring to fix the compass.

27. In an instrument for surveying boreholes, the combination with an outer casing, of plugs fitted in the ends of said casing for closing the same, a revoluble inner casing pivotally supported in said plugs, a frame carried by said inner portion, a compass pivotally carried by said frame, means for fixing the magnetic needle of said compass through the medium of gaseous-fluid pressure, a vertical ring encircling said compass, a spring and pad carried by the frame and adapted to come into engagement with the vertical ring, a catch-lever fixed to the frame and adapted to engage said spring, a piston located in the frame and projecting into a recess in one end of the revoluble inner case, a hole placing the interior of the outer casing in communication with the back of the piston for actuating it by fluid-pressure to release the spring to fix the compass, substantially as described.

28. In an instrument for surveying boreholes, the combination with an outer casing, of plugs fitted in the ends of said casing for closing the same, holes formed in one of said plugs for admitting the gaseous fluid to said casing, a revoluble inner casing pivotally supported in said plugs, a frame carried by said inner casing, means for retaining said frame in position, a compass pivotally carried by said frame, means for fixing the magnetic needle of said compass through the medium of the gaseous fluid admitted to the casing, a vertical ring encircling said compass, a spring and pad carried by the frame and adapted to come into engagement with the vertical ring, a catch-lever fixed to the frame and adapted to engage said spring, a piston located in the frame and projecting into a recess in one end of the revoluble inner casing, a hole placing the interior of the outer casing in communication with the recess at the back of the piston for actuating it by fluid-pressure to release the spring to fix the compass, and means for admitting gaseous fluid to the interior of the casing when the instrument is lowered into position at the point to be surveyed, substantially as described.

29. An instrument for surveying boreholes comprising an outer protecting-casing, an outer casing for the instrument proper, plugs closing the ends of said outer casing, pads of resilient material fitted in the ends of said casing and with packing-rings for steadying said casing in its protecting-casing said plugs being also formed with holes communicating with the interior of said casing and a plug for closing one of said holes, an inner revoluble portion supported in the plugs in the ends of the outer casing on the inside, a frame carried by said inner casing, means for retaining said frame in position therein, a compass pivotally carried by said frame, means for fixing the magnetic needle of said compass through the medium of the gaseous fluid admitted to the casing, a vertical ring encircling said compass, a spring and pad carried by the frame and adapted to come into engagement with the vertical ring, a catch-lever fixed to the frame and adapted to engage said spring, a piston located in the frame and projecting into a recess in one end of the revoluble inner casing, a hole placing the interior of the outer casing in communication with the recess at the back of the piston for actuating it by fluid-pressure to release the spring to fix the compass, and means located in the protecting-casing for admitting gaseous fluid from said protecting-casing to the outer casing of the instrument through the hole in the plug, substantially as described.

30. An instrument for surveying boreholes comprising an outer protecting-casing, an outer casing for the instrument proper, plugs closing the ends of said outer casing, pads of resilient material fitted in the ends of said casing and with packing-rings for steadying said casing in its protecting-casing, said plugs being also formed with holes communicating with the interior of said casing and a plug for closing one of said holes, an inner revoluble portion supported in the plugs in the ends of the outer casing on the inside, a frame carried by said inner casing, means for retaining said frame in position therein, a compass pivotally carried by said frame, means for fixing the magnetic needle of said compass through the medium of the gaseous fluid admitted to the casing, said means consisting of a valve located in said compass-box, a piece surrounding and forming a chamber round said valve and a distensible diaphragm forming the top of said chamber which when distended fixes the magnetic needle, a vertical ring encircling said compass, a spring and pad carried by the frame and adapted to come into engagement with the vertical ring, a catch-lever fixed to the frame and adapted to engage said spring, a piston located in the frame and projecting into a recess in one end of the revoluble inner casing, a hole placing the interior of the outer casing in communication with the recess at the back of the piston for actuating it by fluid-pressure to release the spring to fix the compass, and means located in the protecting-casing for admitting gaseous fluid from said protecting-casing to the outer casing of the instrument through the hole in the plug, substantially as described.

31. An instrument for surveying bore-holes comprising an outer protecting-casing, an outer casing for the instrument proper, plugs closing the ends of said outer casing, pads of resilient material fitted in the ends of said casing and with packing-rings for steadying said casing in its protecting-casing said plugs being also formed with holes communicating with the interior said casing and the plug for closing one of said holes, an inner revoluble portion supported in the plugs in the ends of the outer casing on the inside, a frame carried by said inner casing, means for retaining said frame in position therein, a compass pivotally carried by said frame, means for fixing the magnetic needle of said compass through the medium of the gaseous fluid admitted to the casing, said means consisting of a pin yieldingly supporting the magnetic needle, and a distensible diaphragm above the disk, which when distended causes the needle to be fixed, and spring-catches for fixing the needle, a vertical ring encircling said compass, a spring and pad carried by the frame and adapted to come into engagement with the vertical ring, a catch-lever fixed to the frame and adapted to engage said spring, a piston located in the frame and projecting into a recess in one end of the revoluble inner casing, a hole placing the interior of the outer casing in communication with the recess at the back of the piston for actuating it by fluid-pressure to release the spring to fix the compass, and means located in the protecting-casing for admitting gaseous fluid from said protecting-casing to the outer casing of the instrument through the hole in the plug, substantially as described.

32. In instruments for surveying bore-holes, the combination of an outer protecting-casing for carrying the instrument, which serves as the storage for a compressed gaseous fluid, an outer casing for the instrument proper, plugs fitted in the ends of said casing formed with a hole placing said outer casing in communication with the protective casing, an inner revoluble casing, a compass carried by said revoluble casing and a plummet carried by said revoluble casing, and means located in the protecting-casing adapted to be operated to allow the compressed gaseous fluid to pass from said casing into the casing of the instrument, and means actuated by said fluid for fixing the magnetic needle and plummet in the positions they assume at the point to be surveyed, substantially as described.

33. In instruments for surveying bore-holes, the combination of an outer protective casing for carrying the instrument, which serves as the storage for a compressed gaseous fluid, an outer casing for the instrument proper, plugs fitted in the ends of said casing formed with a hole placing said outer casing in communication with the protective casing, an inner revoluble casing, a compass carried by said revoluble casing, means for fixing the magnetic needle of said compass by fluid-pressure consisting of a valve located inside the compass-box, a piece surrounding and forming a chamber round said valve and a distensible diaphragm forming the top of said chamber which when distended fixes the magnetic needle, a plummet carried by said revoluble casing, means for fixing said plummet by fluid-pressure consisting of a spring, a lever engaging said spring and a piston actuating said lever to disengage the spring, and means located in the protective casing adapted to be operated to allow the compressed gaseous fluid to pass from said casing into the casing of the instrument, substantially as described.

34. In instruments for surveying bore-holes, the combination of an outer protecting-casing for carrying the instrument, which serves as the storage for a compressed gaseous fluid, an outer casing for the instrument proper, plugs fitted in the ends of said casing formed with a hole placing said outer casing in communication with the protective casing, an inner revoluble casing, a compass carried by said revoluble casing, means for fixing the magnetic needle of said compass by fluid-pressure consisting of a pin yieldingly supporting the magnetic needle, and a distensible diaphragm above the needle, which when distended causes the needle to be fixed, and spring-catches for fixing the needle, a plummet carried by said revoluble casing, means for fixing said plummet by fluid-pressure consisting of a spring, a lever engaging said spring and a piston actuating said lever to disengage the spring, and means located in the protective casing adapted to be operated to allow the compressed gaseous fluid to pass from said casing into the casing of the instrument, substantially as described.

35. In an instrument for surveying boreholes, the combination of a protecting-casing providing storage for a quantity of compressed gaseous fluid, an outer casing for the instrument proper adapted to be placed in communication with the protecting-casing, a valve for controlling the admission of the fluid to the instrument, an electromagnet actuating said valve and an electric cable for passing a current of electricity through said electromagnet to allow of the fluid being passed into the casing of the instrument at any desired point in the bore-hole for fixing the compass and plummet, substantially as described.

36. In an instrument for surveying boreholes, the combination of a protecting-casing providing storage for a quantity of compressed gaseous fluid, an outer casing for the instrument proper formed with a hole in one end thereof, a pipe located in said hole, a valve fitted in the other end of said pipe, an electromagnet in the protecting-casing adapted to raise the valve to admit the fluid to the instrument-casing, an electric cable for passing a current of electricity through the electromagnet to actuate the valve, substantially as described.

37. In an instrument for surveying boreholes, the combination of a protecting-casing providing storage for a quantity of compressed gaseous fluid, a valve to said casing through which said casing may be charged with said gaseous fluid under pressure, a plurality of instruments having outer casings which are made intercommunicating and with inner revoluble casings carrying compasses and plummets, a pipe located in said protective casing through which the fluid is admitted to the instruments, a valve fitted in the upper end of said pipe, an electromagnet in the protective casing adapted to raise the valve to admit the fluid to the casings of the instruments, and an electric cable for passing a current of electricity through the electromagnet to actuate the valve, substantially as described.

In witness whereof I have hereunto set my hand in the presence of two subscribing witnesses.

PERCY EDWARD LEWIS.

Witnesses:
   CHAS. OVENDALE
   R. OVENDALE